(12) United States Patent
Koehler et al.

(10) Patent No.: US 10,927,987 B2
(45) Date of Patent: Feb. 23, 2021

(54) DUCT WITH SHAPE MEMORY MATERIAL, AND INSTALLATION METHOD

(71) Applicant: Raytheon Company, Waltham, MA (US)

(72) Inventors: Frederick B. Koehler, Tucson, AZ (US); Ward D. Lyman, Tucson, AZ (US); Delmar L. Barker, Tucson, AZ (US); Teresa J. Clement, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 944 days.

(21) Appl. No.: 14/861,043

(22) Filed: Sep. 22, 2015

(65) Prior Publication Data

US 2017/0082233 A1 Mar. 23, 2017

(51) Int. Cl.
*F16L 55/18* (2006.01)
*F16L 21/00* (2006.01)
(Continued)

(52) U.S. Cl.
CPC ............ *F16L 21/002* (2013.01); *B29C 65/66* (2013.01); *F16L 13/004* (2013.01); *B29C 65/665* (2013.01); *B29C 65/68* (2013.01); *B29C 66/1122* (2013.01); *B29C 66/1142* (2013.01); *B29C 66/5221* (2013.01); *B29C 66/5229* (2013.01); *B29C 66/71* (2013.01); *B29C 66/72523* (2013.01); *B29C 66/73118* (2013.01);
(Continued)

(58) Field of Classification Search
CPC ...... F16L 21/002; F16L 13/004; B29C 65/66; B29C 66/5221; B29L 2023/22; B29K 2105/02
See application file for complete search history.

(56) References Cited

U.S. PATENT DOCUMENTS 3,972,548 A * 8/1976 Roseen ............... B29C 65/4895
285/381.4
4,773,680 A * 9/1988 Krumme ............... B23P 11/025
285/340

(Continued)

OTHER PUBLICATIONS https://en.wikipedia.org/wiki/Shape-memory_polymer; Wikipedia. Wikimedia Foundation. Web. Sep. 22, 2015.

*Primary Examiner* — Ryan J. Walters
(74) *Attorney, Agent, or Firm* — Renner, Otto, Boisselle & Sklar, LLP

(57) ABSTRACT

Ducting and/or duct couplings can be formed from shape memory polymer material, with the material for example being additively manufactured. The use of shape memory polymer material for one or more of the duct portions may allow for easier installation of the ducting, for example allowing the ducting to be warped and/or bent to fit into or through places that are hard to reach or hard to maneuver through, with the ducting then heated to cause it to return to a predetermined memory shape. The coupling of duct portions together may be accomplished by the duct portions including a shape memory polymer material, with for example ends of the duct portions fitted together, and then heated to use a shape memory property of the material to effect coupling. Heating of the shape memory polymer material also softens the material, allowing it to move to a previously set shape.

7 Claims, 3 Drawing Sheets

(51) Int. Cl.
    *B29C 65/66*     (2006.01)
    *F16L 13/00*     (2006.01)
    *B29C 65/00*     (2006.01)
    *B29C 65/68*     (2006.01)

(52) U.S. Cl.
    CPC .. *B29C 66/73715* (2013.01); *B29C 66/73921* (2013.01); *B29C 66/73941* (2013.01); *B29K 2995/0049* (2013.01)

(56) References Cited

U.S. PATENT DOCUMENTS

| | | | |
|---|---|---|---|
| 2002/0175203 A1* | 11/2002 | Jee | F16L 13/004 |
| | | | 228/131 |
| 2009/0314890 A1 | 12/2009 | Koehler et al. | |
| 2010/0196705 A1* | 8/2010 | Hood | B29C 73/10 |
| | | | 428/355 EP |
| 2011/0232278 A1 | 9/2011 | Lyman et al. | |
| 2012/0211119 A1* | 8/2012 | Rule | F16L 21/00 |
| | | | 138/155 |
| 2013/0101823 A1 | 4/2013 | Sanderson et al. | |
| 2015/0054193 A1* | 2/2015 | Meyer | B29C 64/40 |
| | | | 264/219 |
| 2015/0119479 A1 | 4/2015 | Koehler et al. | |

\* cited by examiner

DUCT WITH SHAPE MEMORY MATERIAL, AND INSTALLATION METHOD

FIELD OF THE INVENTION

The invention is in the field of ducting, in particular duct parts and methods for installing and joining parts of ducts.

DESCRIPTION OF THE RELATED ART

Aircraft ducting primarily for environmental controls for pilots or equipment are conventionally made from molded plastics and rubbers. The manufacturing of these ducts requires expensive tooling and long lead times if the tooling isn't readily available. This long lead time is particularly problematic when aircraft come in for depot and a new section of ducting is needed. Furthermore, these ducts can be long and convoluted in shape and form, making repair and replacement difficult at depot time. At present such ducting is repaired/replaced by ordering new parts from manufacturer or custom making repair parts with conventional tooling. Assembly and repair can take longer times as significant disassembly may be required to get to the area to be repaired.

SUMMARY OF THE INVENTION

Ducting can be made using shape memory polymer materials, with the shape memory effect of the material used to couple duct portions together. The duct portions can be additively manufactured, such as being printed.

A repair or replacement section of duct can be configured using a computer, based on requirements for the location of the ducting. The configuration might include integrated shape memory interconnecting ends, for example made of a shape memory polymer, that will mate up with the existing ductwork. In the case of integrated active interconnects, the new part may be configured to fit over or replace the existing ductwork, then heated to activate its shape memory properties, for example to shrink it to seal and mate. This greatly speeds up the interconnecting process. With respect to installing a new duct, a shape memory polymer duct can be softened then snaked through a contorted path, then heated to regain its formed shape. This could greatly reduce disassembly time sometimes required to install a new section of ductwork.

According to an aspect of the invention, a method of installing a duct includes the steps of: placing together a first duct portion of the duct, and a second duct portion of the duct; and heating a shape memory polymer material that is at least part of the first duct portion above a transition temperature of the shape memory polymer material, the material to change shape toward a permanent shape, thereby mechanically coupling together the duct portions.

According to an embodiment of the method of any paragraph(s) of this summary, the heating the shape memory polymer presses an end of the first duct portion against an end of the second duct portion.

According to an embodiment of the method of any paragraph(s) of this summary, the placing includes inserting an end of one of the duct portions into an end of the other of the duct portions.

According to an embodiment of the method of any paragraph(s) of this summary, substantially all of the first duct portion is made of the shape memory polymer; and the heating includes restoring shape of the first duct portion.

According to an embodiment of the method of any paragraph(s) of this summary, the method includes, prior to the placing: changing the shape of the first duct portion; and moving the first duct portion to where the placing occurs; wherein the changing shape facilitates the moving; and wherein the heating reverses the shape change of the changing.

According to an embodiment of the method of any paragraph(s) of this summary, the moving includes moving the first duct portion to a desired location within a flight vehicle.

According to an embodiment of the method of any paragraph(s) of this summary, the heating causes the shape memory polymer material to conform in shape to an end of the second duct portion.

According to an embodiment of the method of any paragraph(s) of this summary, the method includes, prior to the placing and the heating, additively manufacturing the first duct portion.

According to an embodiment of the method of any paragraph(s) of this summary, the method includes, prior to the placing and the heating, setting the permanent shape for the shape memory polymer material, so to cause the coupling when the heating occurs.

According to another aspect of the invention, a duct includes: a first duct portion; and a second duct portion. The first duct portion includes a shape memory polymer material. The duct portions are coupled together using the shape memory polymer material.

According to an embodiment of the device of any paragraph(s) of this summary, both of the duct portions includes the shape memory polymer material.

According to an embodiment of the device of any paragraph(s) of this summary, the first duct portion is made entirely of the shape memory polymer material.

According to an embodiment of the device of any paragraph(s) of this summary, the first duct portion is additively manufactured.

According to an embodiment of the device of any paragraph(s) of this summary, an end of one of the duct portions fits in to an end of the other duct portion, with the coupling being a locking together of the ends using shape memory forces from at least the first duct.

According to an embodiment of the device of any paragraph(s) of this summary, the end of the second duct portion fits into the end of the first duct portion, with the shape memory forces providing a radially-inward compression of the end of the first duct portion onto the second duct portion.

According to an embodiment of the device of any paragraph(s) of this summary, the second duct portion is made entirely of the shape memory polymer material.

According to yet another aspect of the invention, a duct includes: a first duct portion; a second duct portion; and a shape memory polymer material coupler that fits over ends of the duct portions, and couples together the duct portions. The shape memory polymer material coupler has one or more hollows therein that enhance compliance of the coupler.

According to an embodiment of the device of any paragraph(s) of this summary, the coupler has bulb portions on opposite ends, that engage corresponding grooves in the duct portion.

According to an embodiment of the device of any paragraph(s) of this summary, the coupler interlocks with the duct portions.

According to an embodiment of the device of any paragraph(s) of this summary, the coupler includes locking tabs that extend into cavities in the duct portion, and engage protrusions of the duct portions.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

DETAILED DESCRIPTION

Ducting and/or duct couplings can be formed from shape memory polymer material, with the material for example being additively manufactured. The additive manufacturing allows the ducting to be formed in any of a variety of shapes, as needed, including shapes that are not easily manufactured by other methods, such as injection molding. The use of shape memory polymer material for one or more of the duct portions may allow for easier installation of the ducting, for example allowing the ducting to be warped and/or bent to fit into or through places that are hard to reach or hard to maneuver through, with the ducting then heated to cause it to return to a predetermined memory shape. The coupling of duct portions together may be accomplished by one or both of the duct portions including a shape memory polymer material, with for example ends of the duct portions fitted together, and then heated to use a shape memory property of the material to effect coupling. Heating of the shape memory polymer material also softens the material, allowing it to use its shape memory properties to move to a previously set shape, and also allowing it to conform to conform closely to the shape of the duct portion or portions that are being coupled together. The shape memory polymer material may have an internal hollow that facilitates compliance of the part with changes in shape. The coupling may involve a shape memory polymer part coupling with another part by interlocking with the other part.

Figure 1:
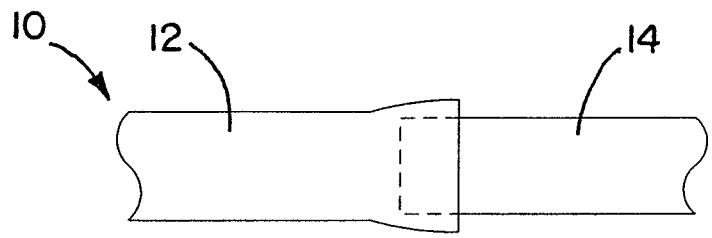
FIG. 1 is a side view of a duct according to an embodiment of the present invention.

FIG. 1 shows a duct 10 that includes a pair of duct portions 12 and 14 that couple together. One or both of the duct portions 12 and 14 may be made of a shape memory polymer material, for example being additively manufactured using such material, such as by a printing process. The shape memory property of the material is used in the coupling together of the duct portions 12 and 14. In addition, the shape memory property of the duct portions 12 and/or 14 may be used to aid in installing the duct 10, as described further below.

Shape memory polymer materials in general have a current form (shape), and a stored permanent form (shape). Once the stored permanent (memory) form has been set, the current (temporary, non-memory) form may be changed by a process of limited heating, deforming while the material is heated, and then cooling. It then maintains that current form until the material is heated again sufficiently to cause it to return to its permanent form, unless otherwise constrained. In order to put the material into a new permanent form, an even higher temperature is necessary.

The transition temperature $T_{trans}$ at which the material softens, and at which it tries to move to its permanent form (shape), may be the glass transition temperature $T_g$ of the material, or may be another temperature. The $T_{trans}$ is less than the permanent temperature $T_{perm}$ above which the material has its permanent shape reset.

In general, shape memory polymer materials have a modulus of elasticity that remains relatively constant with changes in temperature below $T_{trans}$. This means that the shape-memory polymer material may be substantially rigid at low temperatures. As the material is heated up to $T_{trans}$ it relatively quickly transitions to a low modulus of elasticity. This lower modulus of elasticity is maintained relatively constant until the melting temperature of the material is reached. This general comments regarding the behavior of the modulus of elasticity with temperature contrast shape memory polymers with other types of materials, for instance with typical thermoplastics.

Figure 2:
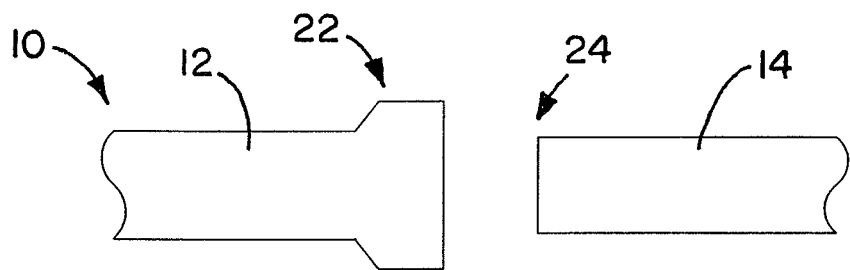
FIG. 2 is a side view according to another embodiment of the present invention, showing a pair of duct portions prior to coupling.
Figure 3:
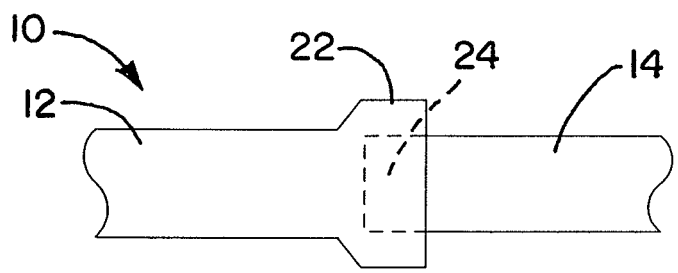
FIG. 3 is a side view showing the duct portions of FIG. 2, with an end of one of the duct portions inserted into the other duct portion.
Figure 4:
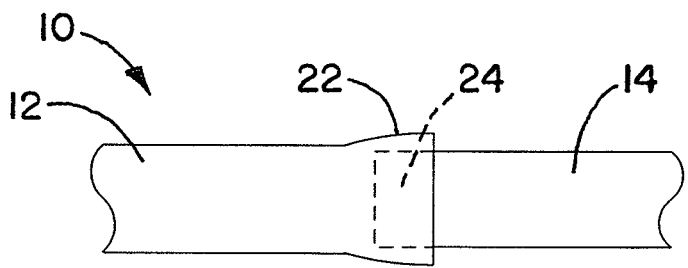
FIG. 4 is a side view of the duct portions of FIG. 2, showing the duct portions coupled together.

These characteristics of a shape memory polymer material may be used advantageously in coupling together parts, such as the duct portions 12 and 14. With reference to FIGS. 2-4, the duct portions 12 and 14 may be joined as follows. First the duct portions 12 and 14 may be produced so as to have permanent form shapes that would cause them to clamp together an end of one of the parts was inserted into an end of the other part. Then, as shown in FIG. 2, one or both of the portions 12 and 14 may be heated and changed in shape such that the portions 12 and 14 would easily fit together. For example, in the illustrated embodiment an end 22 of the duct portion 12 is given a temporary shape that is widened out, so as to easily allow an end 24 of the duct portion 14 to be inserted into the end 22, later during the installation process. After this widening the end 22 may be cooled while this widened shape is held, which imparts the widened shape as the current form or shape of the shape memory material at the end 22.

Turning now to FIG. 3, the installation includes a coupling process where the end 24 is inserted in the widened form of the end 22. After the insertion the end 22 may be heated above $T_{trans}$, as shown in FIG. 4, to cause the shape memory material at the end 22 to contract back toward its permanent form or shape. The end 22 may not fully obtain its permanent, relatively constricted form. Instead the end 22 contracts until further contraction is stopped by the presence of the end 24. The end 22 thus tightly contracts on and around the end 24. This tight connection includes the material of the end 22 conforming to the outer shape of the end 22, for example confirming to any ridges in the end 22. This conformal shape is maintained as the end 22 cools and becomes rigid, forming a new present shape of the end 22. The result is a strong sealing connection between the duct portions 12 and 14.

If disconnection is desired, the end 22 may be heated again above $T_{trans}$, softening the material of the end 22. This allows removal of the end 24 from the end 22, after which the end 22 may be widened (such as with a suitable mandrill) and cooled, to put the end 22 into the condition shown in FIG. 2. Thus the end 22 can be used again to make connection with the end 24 by repeating the process described above.

The connection made as described above has several advantages. An absolute minimum number of parts are required, since the end 24 is an integral part of the duct portion 12. No separate parts are required in addition to the two duct portions 12 and 14 that are the parts being connected. The lack of separate parts results in a lessened risk of loose parts being dropped or otherwise misplaced.

Another advantage is that tools are not needed to effect the connection between the duct portions 12 and 14. All that is required is some sort of heat source once the end 24 is fitted into the end 22. The steps that might involve some sort of tool or other object, such as the setting of the initial widened current state of the end 22, may be accomplished during manufacture of the duct portion 12, or otherwise away from where the duct 10 is installed.

The connection described also results in even force in a circumferential direction around the connection between the ends 22 and 24. This leads to a good seal between the two parts. Any irregularity (non-circularity) in the shape of the end 24 is accounted for by the end 22 contracting to assume the shape of the end 24.

It is also advantageous that the duct portions 12 and 14 can be disconnected without damaging the duct portions 12 and 14, and without use of tools. The duct portions 12 and 14 can be repeatable disconnected and re-connected, if desired.

The connection method shown in FIGS. 2-4 is only one example of many types of similar connections that can be made. For example the end 24 may be made of shape memory polymer material instead of or in addition to the end 22. The shape memory polymer material may be the same for both of the ends, or may have different properties for the different ends 22 and 24, for example having different transition temperatures $T_{trans}$. The heating may transform the shape of either or both of the ends 22 and 24, depending upon the configurations of the ends 22 and 24 and their permanent shapes.

The ends 22 and 24 may have any of a wide variety of suitable shapes. The ends 22 and 24 may both have the same shape, as in the circular cross-section shapes shown in the illustrated embodiment. Alternatively the ends 22 and 24 may have different shapes, and/or the ends 22 and/or 24 may have non-circular shapes, such as oval, rectangular, or other polygonal cross-sectional shapes (or combinations of those shapes).

In one embodiment only the ends 22 and 24 are made of a shape memory polymer. However additional advantages may be realized by making all (or substantially all) of the duct portions 12 and 14 out of a shape memory polymer. Using a uniform material facilitates manufacture of the duct portions 12 and 14, which may be made by an additive manufacturing process, such as 3D printing, using a single material. In addition making all of the duct portions 12 and/or 14 out of shape memory polymer material may facilitate installation of the duct 10, by allowing the duct portions 12 and/or 14 to be deformed into a current shape that facilitates placement of the duct portions 12 and/or 14 where they need to go, such as through a cramped access to an aircraft bay. After the duct portions 12 and 14 are placed where they need to go for final installation they can be heated above the transition temperature of the shape memory polymer, to transform the duct portions 12 and 14 into their permanent shapes, set previously to be the desired installed shapes of the duct portions 12 and 14.

Figure 5:
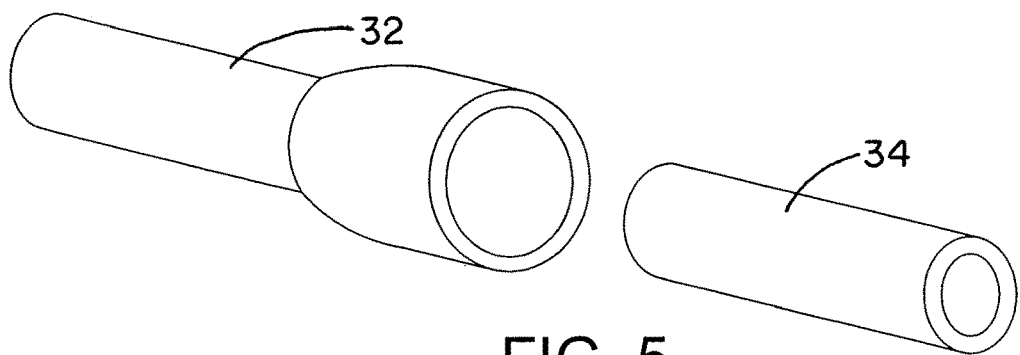
FIG. 5 is an oblique view of a pair of duct portions according to yet another embodiment of the invention, with the duct portions shown prior to installation and coupling.
Figure 6:
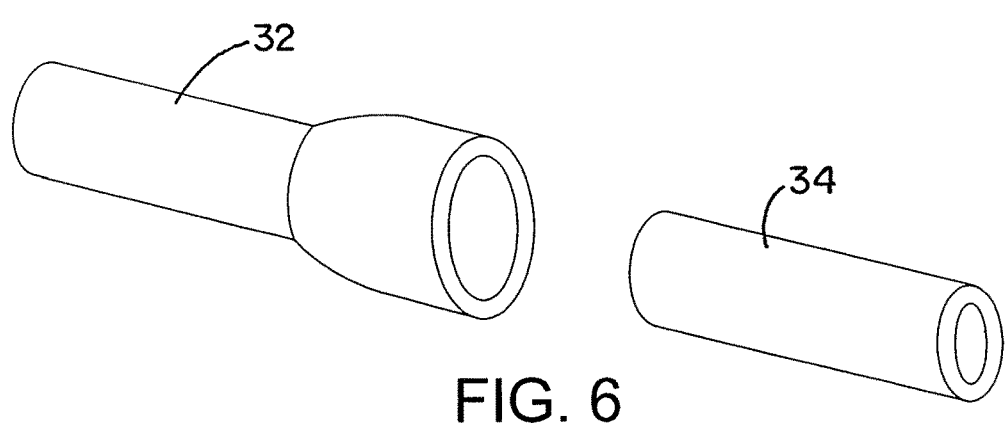
FIG. 6 is an oblique view of the duct portions of FIG. 5, showing the duct portions with altered shapes (flattened), to facilitate installation.
Figure 7:
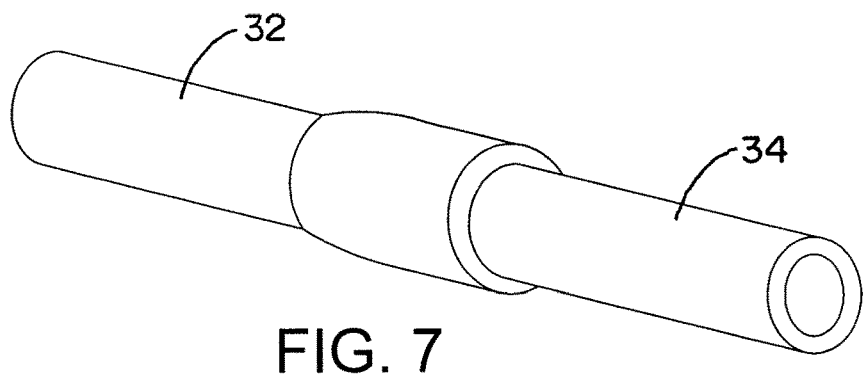
FIG. 7 is an oblique view of the duct portions FIG. 5, with the duct portions heated to couple them together, and to reverse the shape alteration of FIG. 6.

FIGS. 5-7 illustrate this process. In FIG. 5 a pair of duct portions 32 and 34 are formed and set with permanent shapes that are the desired final configurations of the duct portions 32 and 34. Then in FIG. 6 the duct portions 32 and 34 are heated above the transition temperature and have their shape changed to a current shape that makes installation possible or easier. The shape change may involve any of a variety of changes in shape, for example flattening or compressing the duct portions 32 and 34 (as is illustrated in FIG. 6), or folding the duct portions 32 and 34. Other deformations, such as warping, may also make the duct portions 32 and 34 into or through constricted areas that must be negotiated as part of the installation process.

With reference to FIG. 7, once the duct portions 32 and 34 have been moved into place, the duct portions 32 and 34 may be heated above the $T_{trans}$ to get them to return to their permanent (memory) shapes, as well as to couple together the ends of the duct portions 32 and 34, as was described above in connection with FIGS. 2-4. The duct portions 32 and 34 may be heated at the same time or at different times (sequentially or in overlapping time periods). Different parts of the duct portions 32 and 34 may also be heated at different times, with for example the heating of the ends of the duct portions 32 and 34 being heated to couple together the duct portions 32 and 34 either before or after the heating of the main parts of the duct portions 32 and 34.

An additional advantage of the process described above is that inadvertent deformations of the duct portions 32 and 34 may be removed by the subsequent heating. The duct portions 32 and 34 may be deformed during storage, handling, or installation, apart from any deliberate changes in shape done to facilitate installation. The heating above $T_{trans}$ at the end of the installation process, may remove these deformations.

Figure 8:
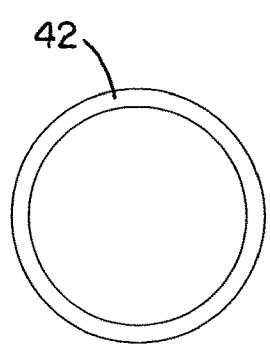
FIG. 8 is an end view of a duct portion in accordance with still another embodiment of the present.
Figure 9:
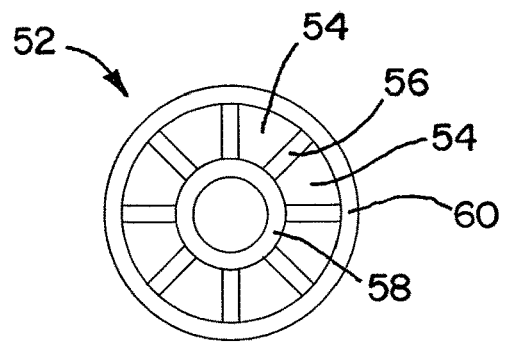
FIG. 9 is an end view of a duct portion in accordance with a further embodiment of the present invention.

The various duct portions described above may have any of various configurations, including a solid wall configuration 42 (FIG. 8) and a configuration 52 with hollows 54, separated by ribs 56, between an inner wall 58 and an outer wall 60 (FIG. 9). More complex wall configurations, such as the configuration 52, may provide added strength to the duct, while still maintaining light weight. Additive manufacturing may make complex wall configurations practical to construct.

The shape memory polymers for the duct portions, or parts of duct portions, may be any of a variety of suitable such polymers. Examples include polyurethanes, polyethylene terephthalate (PET), polyethyleneoxide (PEO), epoxies, acrylics, polyether ether ketone (PEEK) and other suitable polymers. The polymers may be suitable block copolymers, and/or may be thermoplastics and/or thermoset materials.

The duct portions described above may be used in a process or repairing or replacing parts of a duct system. Additive manufacturing may be used to avoid the need for expensive tooling, long lead times for producing parts, and/or a need for stocking a wide variety of replacement parts for ducts or duct portions having different configurations. Data concerning desired dimensions and configurations of a duct portion may be entered into and/or stored in a computer, which may be operatively coupled to an additive manufacturing system, for example including a three-dimensional printer. The data could be used to produce custom parts on short notice, while saving weight by only requiring a general-purpose shape memory polymer as the raw material.

The duct portions described above may be coupled to other similar duct portions, and/or may be coupled to existing duct portions, interfacing with existing duct portion ends. The duct portions may have any of a wide variety of suitable shapes, such as straight, having bends or twists, or having irregular convoluted shapes.

Figure 10:
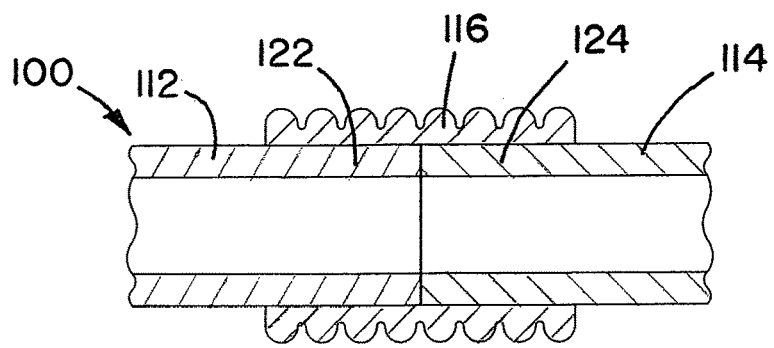
FIG. 10 is a side cross-sectional view of a duct system, according to another embodiment of the invention.

FIG. 10 shows a different sort of duct connection, where a duct 100 includes a pair of duct portions 112 and 114 that are joined together by a coupler 116 that includes a shape memory polymer. The coupler 116 may be a sleeve that fits over ends 122 and 124 of the respective duct portions 112 and 114. The coupler 116 may have a permanent shape that allows it to mechanically engage both of the ends 122 and 124, and a temporary (current) it shape that allows it to fit over the ends 122 and 124. The coupler 116 fits over the ends 122 and 124, and then is heated to cause it to change shape, to move toward its permanent (memory) shape. This causes the coupler 116 to soften and to compress around and conform to the shapes of the ends 122 and 124, locking the ends 122 and 124 together after the coupler 116 cools.

Figure 11:
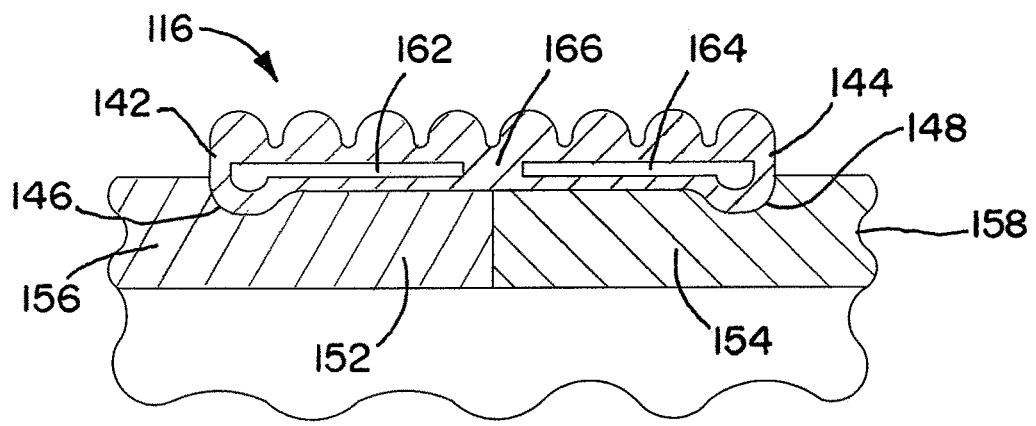
FIG. 11 is a side cross-sectional view showing part of a duct system according to yet another embodiment.

FIG. 11 shows details of one embodiment of the coupler 116 (FIG. 10), a coupler 136 that has bulbs (beads or bulbous or expanded portions) 142 and 144 on either end that engage and fit into detents 146 and 148 of ends 152 and 154 of duct portions 156 and 158. The coupler 116 also includes hollows 162 and 164 that allows for added compliance during the installation process. The hollows 162 and 164 may be separated by a solid portion 166 that is at the location of where the ends 152 and 154 are in contact with each other. The hollows 162 and 164 may be fully enclosed within the material of the coupler 116, and may have annular shapes. The hollows 162 and 164 may be expanded in the vicinity of the bulbs 142 and 144. The hollows 162 and 164 may be produced easily by an additive manufacturing process, but be difficult or impossible to produce by certain other manufacturing processes, such as molding.

Alternative configurations may have only the bulbs or the hollows, rather than both. Hollows for producing added compliance may have many possible suitable configurations.

Figure 12:
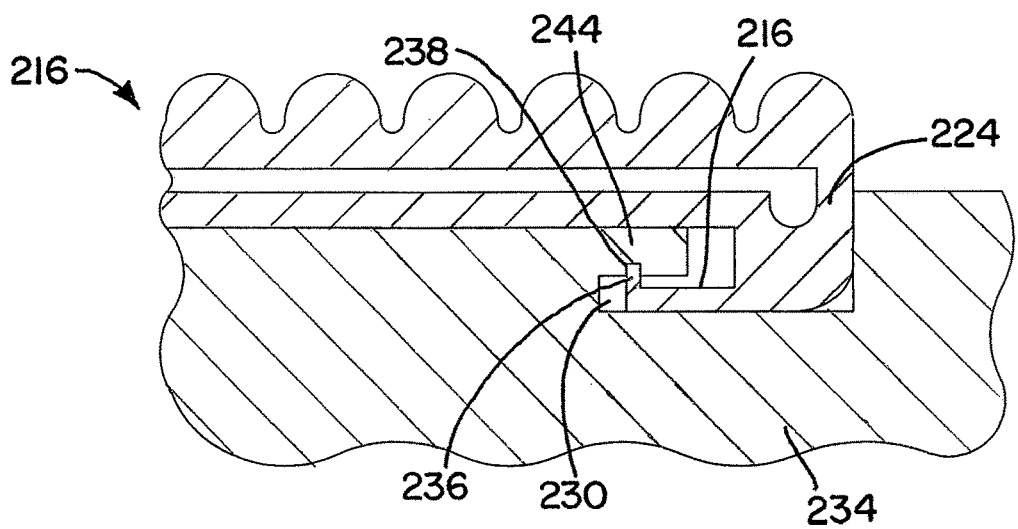
FIG. 12 is a side cross-sectional view showing part of a duct system according to still another embodiment.

FIG. 12 shows details of another embodiment of the coupler 116 (FIG. 10), a coupler 216 which has an interlocking feature, a pair of extended locking tabs extending from bulbs at ends of the coupler 216, such as a tab 222 extending from a bulb 224. The tab 222 is configured to extend into a cavity 230 in one of the duct portions 234. A bent end 236 of the tab 222 fits into a groove or notch 238 on an underside of a protrusion or extension 244 of the duct portion 234. This interlocking engagement between the tab 222 and the extension 234 (and a possible similar engagement on the opposite side of the coupler 116) aids in retaining the coupler 116 engaged with duct portions such as the duct portion 234. The shape of the tab 222 may allow it to use its shape memory properties to curl around the protrusion 244, within the cavity 230, to engage the groove or notch 238.

Many variations are possible for configurations in which a coupler mechanically interlocks with duct portions. The coupler may have one or more protruding parts that interlock with some part of one or more duct portions that are coupled together. Complex shapes for the coupler and/or for the duct portions may be produced by additive manufacturing, such as described above.

Other variations are possible, such as combinations of shape memory material in both the duct portions and a coupler that connects the duct portions. The use of shape memory material allows complex shapes to be fitted together by processes that include heating of the duct parts.

The ducts described herein may be used for any of a variety of purposes. Examples include ducts for aircraft or space vehicles, as well as ducts for irrigation systems or other systems through which fluids are transported.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method of installing a duct, the method comprising:
   placing together a first duct portion of the duct, and a second duct portion of the duct; and
   heating a shape memory polymer material that is, prior to the heating, at least part of the first duct portion above a transition temperature of the shape memory polymer material, whereby the material changes shape toward a permanent shape, thereby mechanically coupling together the duct portions,
   wherein substantially all of the first duct portion is made of the shape memory polymer,
   wherein the heating includes restoring shape of the first duct portion, and
   wherein prior to the placing and the heating, additively manufacturing the first duct portion.

2. The method of claim 1, wherein the heating the shape memory polymer presses an end of the first duct portion against an end of the second duct portion.

3. The method of claim 1, wherein the placing includes inserting an end of one of the duct portions into an end of the other of the duct portions.

4. The method of claim 1, further comprising, prior to the placing:
   changing the shape of the first duct portion; and
   moving the first duct portion to where the placing occurs;

wherein the changing shape facilitates the moving; and
wherein the heating reverses the shape change of the changing.

5. The method of claim 4, wherein the moving includes moving the first duct portion to a desired location within a flight vehicle.

6. The method of claim 1, wherein the heating causes the shape memory polymer material to conform in shape to an end of the second duct portion.

7. The method of claim 1, further comprising, prior to the placing and the heating, setting a predetermined permanent shape for the shape memory polymer material.

\* \* \* \* \*